(12) United States Patent
Irmer

(10) Patent No.: US 11,480,588 B2
(45) Date of Patent: Oct. 25, 2022

(54) METHOD FOR PROVIDING A PROBE DEVICE FOR SCANNING PROBE MICROSCOPY

(71) Applicant: Nanotools GMBH, Munich (DE)

(72) Inventor: Bernd Irmer, Munich (DE)

(73) Assignee: Nanotools GmbH

( * ) Notice: Subject to any disclaimer, the term of this patent is extended or adjusted under 35 U.S.C. 154(b) by 303 days.

(21) Appl. No.: 16/765,382

(22) PCT Filed: Nov. 13, 2018

(86) PCT No.: PCT/EP2018/081016
§ 371 (c)(1),
(2) Date: May 19, 2020

(87) PCT Pub. No.: WO2019/101570
PCT Pub. Date: May 31, 2019

(65) Prior Publication Data
US 2020/0341028 A1 Oct. 29, 2020
US 2021/0318351 A9 Oct. 14, 2021

(30) Foreign Application Priority Data
Nov. 23, 2017 (DE) ...................... 10 2017 127 645.9

(51) Int. Cl.
*G01Q 30/04* (2010.01)
*G01Q 70/10* (2010.01)
(Continued)

(52) U.S. Cl.
CPC ............. *G01Q 30/04* (2013.01); *G01Q 70/10* (2013.01); *G01Q 70/16* (2013.01); *G01Q 70/14* (2013.01)

(58) Field of Classification Search
CPC ......... G01Q 30/04; G01Q 70/14; G01Q 70/10
(Continued)

(56) References Cited

U.S. PATENT DOCUMENTS

| 8,160,848 B2 | 4/2012 | Watanabe et al. |
| 2008/0154521 A1* | 6/2008 | Bao ........................ G01Q 40/00 977/878 |

(Continued)

FOREIGN PATENT DOCUMENTS

DE 10 2006 008 858 A1 9/2007

OTHER PUBLICATIONS

Bernard Haochih Liu, Simulation-aided design and fabrication of nanoprobes for scanning probe microscopy, 2011, Ultramicroscopy 111, 337-341, Taiwan.
(Continued)

*Primary Examiner* — Nicole M Ippolito
(74) *Attorney, Agent, or Firm* — Steve LeBlanc, LLC

(57) ABSTRACT

The invention relates to a method for providing a probe device for scanning probe microscopy, in particular for atomic force microscopy, wherein a scanning probe microscope is used for measuring a sample by means of a tip which is arranged on a cantilever of the probe device and which has a tip geometry. According to the invention, in a step upstream of the manufacturing process producing the tip, the tip geometry is optimized based on a selected tip basic form with regard to defined, required measurement properties, by computer simulating and evaluating the tip geometry, and modifying the tip geometry according to the evaluation with regard to these measurement properties. The invention further relates to a probe device for scanning probe microscopy, in particular for atomic force microscopy, having a cantilever and a tip formed on the cantilever in the nanometer range, with which samples to be measured can be scanned.

15 Claims, 3 Drawing Sheets

(51) Int. Cl.
  *G01Q 70/14*  (2010.01)
  *G01Q 70/16*  (2010.01)
(58) Field of Classification Search
  USPC .................................. 850/40, 56, 57, 60
  See application file for complete search history.

(56) References Cited

U.S. PATENT DOCUMENTS

2012/0080596 A1*  4/2012  Vandervorst ......... H01J 37/285
                                                  250/307
2012/0174268 A1   7/2012  Vafai et al.

OTHER PUBLICATIONS

Frederic Sansoz A force-matching method for quantitative hardness measurements by atomic force microscopy with diamond-tipped sapphire cantilever, 2010 Ultramicroscopy 11-19.

JL Choi, Simulation of atomic force microscopy operation via three-dimensional finite element modelling, 2009 Nanotechnology 20, 065702.

Guebum Han, Fabrication of tungsten probe for hard tapping operation in atomic force microscopy, Ultramicroscopy 161 (2016) 66-73.

Antonio Boccaccio, Effect of AFM probe geometry on visco-hyperelastic characterization of soft materials, 2015 Nanotechnology 26 325701.

* cited by examiner

METHOD FOR PROVIDING A PROBE DEVICE FOR SCANNING PROBE MICROSCOPY

PRIORITY CLAIMS

This application claims priority to PCT application PCT/EP2018/081016 filed Nov. 13, 2018, which claims priority to German Patent Application Number 10 2017 127 645.9 filed Nov. 23, 2017.

FIELD OF THE INVENTION

The present invention relates to a method for providing a probe device for scanning probe microscopy, in particular for atomic force microscopy, wherein a scanning probe microscope is used for measuring a sample by means of a tip which has a tip geometry and which is arranged on a cantilever of the probe device.

BACKGROUND OF THE INVENTION

Scanning probe microscopy and/or atomic force microscopy can be used, for example, to scan semiconductor components and structures arranged therein for quality assurance. The structures can include, for example, trenches and/or holes in the semiconductor component, which can have a width and/or a diameter of a few tens of nanometers and a depth of a several hundred nanometers. For example, in order to be able to measure the straightness and/or parallelism of the walls of the trenches and/or a depth of the trenches and/or of holes, the tip is inserted into the trenches or the holes. Of course, it must be commensurately thin. In addition, the tip must have a certain length in order to also be able to scan the bottom of the trenches or the holes. However, the measurement result can be distorted due to interactions between the tip and the walls of the trenches. This can be due in particular to the fact that the tip is deflected when the walls are scanned. The tip can be pulled towards the walls by van der Waals interactions, for example. For example, the tip may bend toward the wall. Reliable measurement is, of course, very difficult. To keep the tip deflection as low as possible, a relatively thick tip can be used. On the other hand, the length of the tip can also be kept as short as possible in order to reduce the deflection of the tip. However, if thicker tips are used for measurement, the measurement resolution may decrease. In general, attempts may be made to make the tip stiffness as high as possible to minimize tip deflection and/or deflection.

DE 10 2006 008 858 A1 discloses a probe device for scanning probe microscopy comprising a cantilever and a tip in the nanometer range which is formed on the cantilever and is produced by means of additive methods, by means of which samples to be measured can be scanned. The disadvantage of this is that the geometry of the tip is predetermined, so that scanning the sample with such tips is not optimal.

BRIEF DESCRIPTION OF THE INVENTION

The object of the present invention is therefore to eliminate this disadvantage. The object is achieved by a method for providing a probe device for scanning probe microscopy, and by the probe device having the features of the independent claims.

A method is proposed for providing a probe device for scanning probe microscopy. Scanning probe microscopy can be atomic force microscopy in this case. A scanning probe microscope can measure a sample by means of a tip which has a tip geometry and which is arranged on a cantilever of the probe device. The tip is thus the measuring organ with which the sample and/or the sample structure can be measured. The tip can be, for example, an atomic force microscope tip/a tip for an atomic force microscope.

The tip can also have a thickness in the range of a few nanometers and a length of a few hundred nanometers for measuring the sample. The tip can also have a length of a few thousand nanometers. A ratio of the length of the tip to the thickness of the tip can be up to 100. In addition, the tip can be cylindrical. Additionally or alternatively, the tip can also have an elliptical cross-section. The exact dimensions and shape of course depend on customer requirements. The length can be, for example, only a few tens of nanometers. The length, thickness, and shape of the tip can be described by means of a tip geometry.

The provision of the probe device according to the invention can include, for example, the manufacturing process of the tip on the cantilever in order to send the probe device produced in this way to the customer with the tip on the cantilever. Alternatively, the provision of the probe device according to the invention can also include only providing a dataset which at least partially describes the tip. For example, the dataset can include CAD data that defines a geometry of the tip. In this way, for example, the dataset can be sent to the customer over the Internet, who then manufactures or can have the tip manufactured according to the dataset.

According to the invention, in a step upstream of the actual manufacturing process which produces the tip, the tip geometry is optimized, proceeding from a selected basic tip form, with regard to defined, required measurement properties. This is done by computer simulating the tip geometry with respect to these measurement properties, evaluating said tip geometry, and modifying the tip geometry according to the evaluation.

By way of example, the measurement properties can be specified by the customer, who intends to use the tip to measure a specific structure, for example trenches and/or holes, of a semiconductor component that is being manufactured, or of a finished component, in order to be able to come to a conclusion about the quality of the semiconductor component, for example. In this process, for example, the customer provides requirements for the measurement properties of the tip, such that the structure of a semiconductor component can be measured with sufficient accuracy, i.e., with a correspondingly high measurement resolution. By means of the tip, for example, a customer further indicates a depth, a width, and/or a shape of the trenches and/or holes of a sample to be detected. For example, the walls and/or the bottom of the trenches will also be measured, or the corners of the trenches will be scanned. A parallelism of the walls or an angle of the corners of the trenches can also be a requirement for the semiconductor component to be of high quality. As such, the customer may wish to measure the walls or corners accordingly.

For example, the customer provides requirements for the measurement properties such that a 200 nanometer deep trench should be scanned by means of the tip. Subsequently, a tip can be selected which has a basic tip form, which, for example, is 10%-50% longer, by way of example. As a result, at the least, a trench with a depth of 200 nanometers can be scanned. Furthermore, a basic tip form can be selected which allows the above-mentioned measurement resolution. In addition, the basic tip form can be suitable for measuring the above-mentioned corners of the trenches. Using the basic tip form, a pre-selection from various existing tip geometries can be made in advance. The selection of the basic tip form can be based on empirical values. The basic tip form can thus serve as a starting point for the subsequent optimization of the tip geometry.

The optimization can be carried out, for example, in such a way that the tip is made as thin as possible, but a stiffness is still high enough to keep bending and/or deflection of the tip in the direction of a wall as low as possible, and to not influence measurement resolution too much. Additionally or alternatively, the optimization can also consist of the tip being formed as long as possible in order to be able to measure even deeper structures if necessary. Again, the stiffness of the tip should not be neglected as a consideration.

In order to optimize the tip geometry, it is simulated and evaluated according to the invention with regard to the desired or required measurement properties. With the aid of the simulation, for example, a deflection of the tip during the measurement of the trench can be calculated given a tip geometry, for example the thickness, the length of the tip and/or the shape of the cross-section of the tip. The evaluation can then be carried out, by means of which it can be decided whether the simulated deflection of the tip is still within the measurement characteristics required by the customer.

The evaluation can, for example, be such that the measurement properties required by the customer are not achieved. For example, the tip may be too short to measure the trench and/or the hole in the semiconductor component to the bottom. The evaluation can of course also produce the result that the measurement properties of the customer have been achieved. Depending on the evaluation, the tip geometry can be modified. If the measurement properties are not achieved, for example, the tip geometry can be modified such that the tip is made longer, for example.

In an advantageous development of the invention, a stiffness can be taken into account when evaluating the measurement properties. The stiffness can describe a resistance to bending. The stiffness can also depend on the modulus of elasticity of the tip. For example, the customer can place a requirement on the tip so that the tip has a certain stiffness. Additionally or alternatively, a measurement resolution of the tip can also be taken into account in the evaluation. In order to be able to measure structures of the sample, the measurement resolution must also be in the range of the size of the structure. The measurement resolution is therefore particularly preferably one of the important evaluation parameters of the tip. Additionally or alternatively, the dimensions of the tip can also be taken into account. For example, the tip must have a length such that a bottom of a structure can be measured.

It is advantageous if an evaluation value is assigned in the evaluation of the stiffness of the tip. For example, if the tip has a simulated stiffness that corresponds to 50% of the stiffness required by the customer, the tip can be assigned an evaluation value with regard to the stiffness of 50%. For example, if the tip has a simulated stiffness that corresponds to the stiffness that the customer requires, an evaluation value with regard to the stiffness of 100% can be assigned to it. If, on the other hand, the tip has, for example, a simulated stiffness that corresponds to twice what the customer requires, an evaluation value with regard to the stiffness of 200% can be assigned to it. This enables a quantitative evaluation of the stiffness by means of the simulation of the tip geometry. The evaluation value can have properties such that a higher evaluation value describes better measurement properties of the tip.

Additionally or alternatively, an evaluation value can also be assigned to the measurement resolution of the tip. If it turns out during the simulation, for example, that the tip only has a measurement resolution that corresponds to 50% of the measurement resolution required by the customer, the evaluation value of 50% can be assigned to it. This also enables the simulated measurement resolution to be quantified. Here, too, a higher evaluation value can describe better measurement properties—in this case, the measurement resolution.

Additionally or alternatively, an evaluation value can also be assigned to the dimensions of the tip. The dimensions can include the thickness and length of the tip. For example, in order to be able to measure a bottom of a trench and/or a hole in a semiconductor component, the tip must have a thickness which is thinner than the width of the trench in order to be able to be inserted into it. The tip must also be longer than the depth of the trench in order to reach it. The dimensions of the tip must be suitable for being able to measure the structure and/or the sample. For example, a Boolean evaluation value, namely "yes" or "no," can be assigned to the dimensions. For example, the dimensions, for example the thickness, can be assigned a value of "0" or "1." The evaluation value "1" means, for example, that the sample can be measured using the simulated tip geometry. The value "0," on the other hand, can mean that the tip cannot be used to measure the sample, such that the tip, for example, cannot be inserted into the structure due to its thickness.

The evaluation values from the evaluation of the stiffness, the measurement resolution and/or the dimensions of the tip can advantageously be combined with one another. At least two evaluation values can be combined to form an overall evaluation value. This means that the tip can be described with a single value. The overall evaluation value can be formed in such a way that a higher overall evaluation value describes better measurement properties.

It is also advantageous if the tip geometry is successively optimized by repeating the steps of the computer-aided simulation, evaluation, and/or modification. This allows the tip to be continuously improved. If, for example, the tip was lengthened due to the evaluation in a previous modification step, the lengthened tip geometry can now be simulated again to check whether the tip is suitable for scanning the structure of the customer's sample and/or whether the tip corresponds to the required measurement properties. It cannot be ruled out that the extended tip now deflects to such an extent that the measurement can no longer be carried out with the required measurement resolution. After the simulation, the evaluation is therefore preferably carried out again. Next, a decision can be made as to whether the tip is still within the required measurement properties or whether the modifications incorporated in the simulation must be undone. Additionally or alternatively, other modifications can be made to the tip geometry.

Additionally or alternatively, it is advantageous if the simulation, the evaluation, and the modification of the tip geometry are carried out several times in succession. This allows the tip geometry to be optimized in an iterative process. For example, the tip can be successively extended. The tip geometry can be simulated and evaluated after each individual extension. If, for example, the tip no longer meets the required measurement properties after a single modification, the modification can be reversed, for example, and the tip can preferably be modified in another way.

It is also advantageous if the computer-aided optimization of the tip geometry is carried out in a partially automated manner. For example, the simulation and/or evaluation can take place in a partially automated manner. For example, an interval from a minimum to a maximum tip length can be specified, and different tips with different tip lengths can be simulated in accordance with this interval. For example, a series of several tens of steps can be used for the simulation throughout the interval. For example, a tip with a length of 200 nanometers can be the starting point, and the length can be gradually increased by 5 nanometers up to 300 nanometers. Each individual tip is simulated individually and can be evaluated individually. Additionally or alternatively, the tip thickness can also be simulated step-by-step in accordance with an interval. For example, the tip thickness can be simulated step-by-step in accordance with an interval for each individual tip length. This interval and/or the interval steps can be input manually. The interval boundaries and/or the interval steps can also be changed manually. Additionally or alternatively, other parameters of the tip can be simulated step-by-step in accordance with an interval. For example, an angle in transition region, wherein each region has a different tip thickness, can be modified in accordance with an interval and simulated and evaluated accordingly. Furthermore, the tip geometry can be modified manually, for example. A manufacturer of the tip may already have some experience with the behavior of the tip geometry, such that he may know well by what length he can extend the tip or whether the tip has to be made thicker, for example.

It is advantageous if the tip thickness as part of the tip geometry is reduced in at least one region when an evaluation value lying above a defined threshold is exceeded. Additionally or alternatively, if the value exceeds a defined overall evaluation value, the tip thickness can be reduced in at least one region during the simulation as part of the tip geometry. For example, the tip can consequently be stiffer than the customer demands. The tip thickness can then be reduced in at least one region in the simulation so that the tip can be inserted, for example, deeper into a trench and/or a hole in the semiconductor component, although it still has sufficient stiffness. The tip can preferably be thinned in a frontal region, so that the front part of the tip can scan finer structures.

Additionally or alternatively, the tip thickness can be increased in at least one region if the evaluation value and/or overall evaluation value falls below the defined threshold. By way of example, the stiffness may not be adequate; as a result, the tip is simulated with a great thickness in at least one region in order to increase the stiffness. This process can include ensuring that the tip can still be inserted into the trench and/or the hole of the semi-conductor component.

It is also advantageous if the tip length as part of the tip geometry is increased in the simulation when an evaluation value and/or overall evaluation value exceeds a defined threshold. If, for example, the stiffness of the tip exceeds the stiffness required by the customer, the tip length can be increased in the simulation in order to be able to measure even deeper structures.

Additionally or alternatively, if the evaluation value and/or the overall evaluation value falls below a defined value, the tip length can be reduced in the simulation, for example if the calculated and evaluated stiffness is not sufficient to achieve the stiffness required by the customer. To increase the stiffness, the tip length can be reduced.

It is advantageous if the steps of simulating, evaluating and/or the simulated lengthening of the tip are repeated until at least one evaluation value of the tip geometry exceeds a predetermined threshold. Additionally or alternatively, the steps of simulating, evaluating, and/or the simulated lengthening of the tip can be repeated until the overall evaluation value of the tip geometry exceeds the predetermined threshold. As a result, the computer-aided optimization can be shortened, since it is ended when the measurement properties required by the customer are exceeded.

In order to obtain a tip with good measurement properties, the steps of simulating, evaluating, and/or modifying can be repeated until at least one evaluation value no longer improves as the tip geometry is modified further. Additionally or alternatively, the steps of simulating, evaluating, and/or modifying can be repeated until the overall evaluation value no longer improves. This allows the tip to be optimized until a tip with optimal measurement properties is reached.

It is also advantageous if the tip geometry is simulated, evaluated, and modified until the evaluation worsens upon further modification of the tip geometry. As described above, for example, the evaluation can be assigned a numerical value. The numerical value can correspond, for example, to a percentage of the stiffness required by the customer. The numerical value can also include a percentage of a measurement resolution required by the customer. If this numerical value worsens upon a further modification, this can be an indication that the tip geometry is optimal with these parameters (e.g., length and/or thickness of the tip). This makes it possible to decide that further optimizations are no longer necessary, or at least are no longer relevant to the work requirements.

The simulation of the tip geometry can advantageously be carried out by means of finite element methods. Additionally or alternatively, the evaluation can also be carried out using finite element methods. Finite element methods are proven methods for simulating, for example, bending of components.

Furthermore, it is advantageous if the tip is manufactured in accordance with the optimized tip geometry by means of additive and/or subtractive manufacturing processes. The additive method can include, for example, electron beam-induced deposition, with which the tip can be built up in a targeted and defined manner.

It is also advantageous if at least part of a surface section of the tip is removed by means of a subtractive method at least after one step of the additive manufacturing method. The subtractive method can include, for example, reactive ion etching. This makes it possible, for example, to thin areas of the tip that are too thick.

Also proposed is a probe device for scanning probe microscopy, having a cantilever and a tip formed on the cantilever in the nanometer range, with which a sample to be measured can be measured.

According to the invention, the probe device is formed according to at least one method step of the preceding and/or following description.

In an advantageous development of the invention, the tip is at least partially formed from an amorphous carbon. Additionally or alternatively, the tip can also be formed from a crystalline diamond. These materials have high moduli of elasticity, such that the tip has high stiffness. This reduces bending of the tip.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
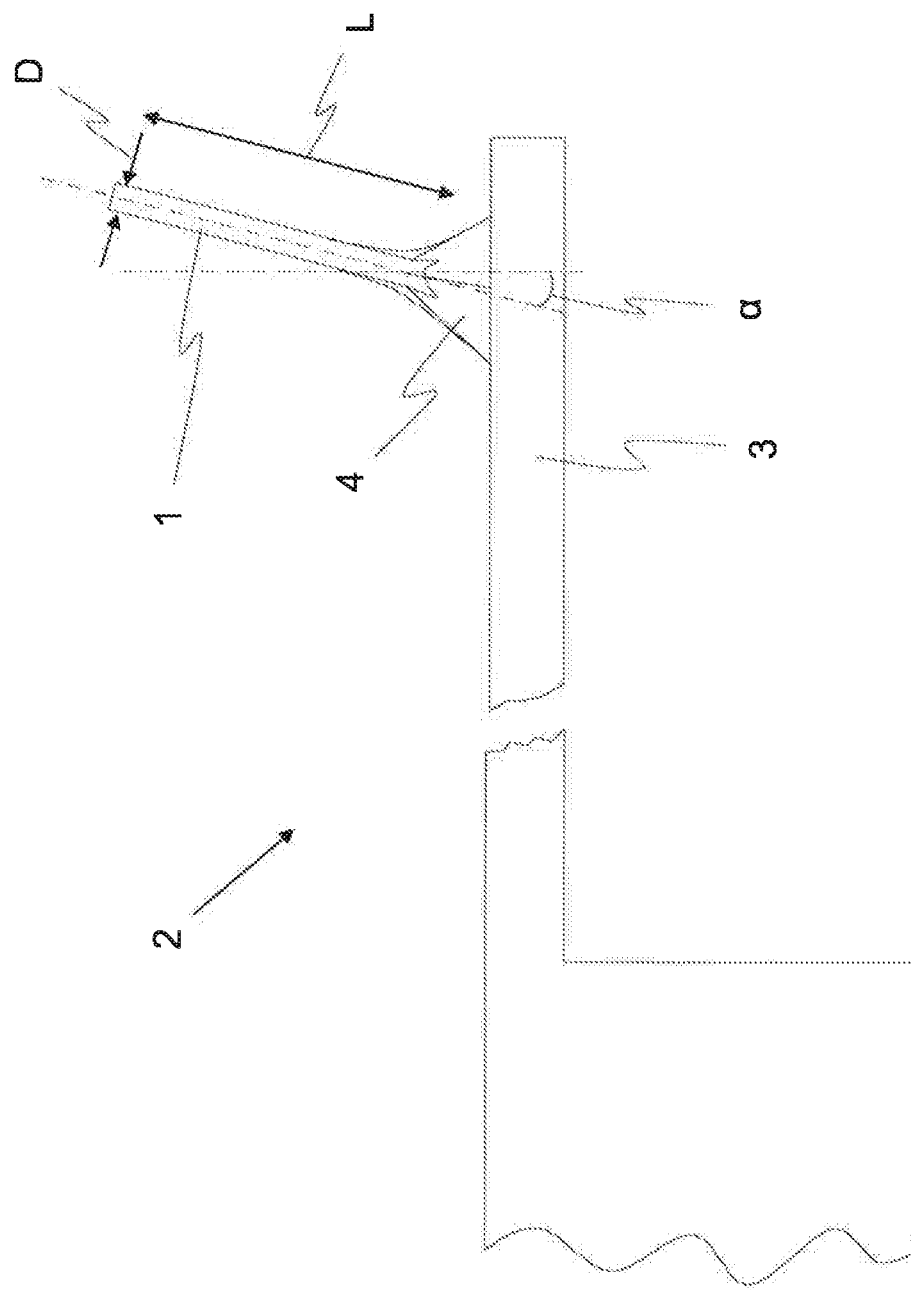
FIG. 1 shows a schematic side view of a probe device having a tip on a cantilever.

FIG. 1 shows a schematic side view of a probe device 2 having a tip 1 on a cantilever 3. The probe device 2 can be used for scanning probe microscopy. The probe device 2 can also be used for atomic force microscopy. According to the present embodiment, the tip 1 has an angle α with respect to a perpendicular to the cantilever 3. Alternatively, the tip 1 can also be arranged vertically on the cantilever 3. Furthermore, the tip 1 can be arranged on a tip base 4 on the cantilever 3. The tip base 4 can be pyramid-shaped, for example. By means of the tip base 4, the tip 1 can be arranged more stably on the cantilever 3.

The tip 1 also has a length L. In addition, the tip 1 has a thickness D. For example, the length L can be in the range of a few hundred nanometers, and the thickness D in the range of a few tens of nanometers, for example between 3 nanometers and 20 nanometers. The length L of the tip 1 can also be a few, for example 10, micrometers. A cross-section of the tip 1 can be round, elliptical, or angular, for example.

A scanning probe microscope or atomic force microscope can scan a sample (not shown here) by means of the tip 1. The sample can be, for example, a semiconductor component which is in the process of being manufactured or has been completed and which has a structure on a surface which can be scanned by the tip 1 for quality assurance. The structure can comprise, for example, trenches and/or holes that have a depth and a width. By means of the tip 1, the depth can be scanned, thereby verifying whether the semiconductor component corresponds to the measurement properties required by the customer. A straightness and/or parallelism of the walls of the trenches can also be scanned by means of the tip 1. For some applications of the semiconductor component, a shape of corners, in particular between the walls and the bottom of the trenches, can also play a role, such that the corners of the trenches can also be scanned by means of a tip 1.

However, if the tip 1 is inserted into such a trench, a tip 1 may be attracted to the wall, for example due to van der Waals interactions, and the tip 1 may bend due to the interactions. A measurement can thereby be falsified, such that it is difficult to come to a conclusion about the quality of the structure of the semiconductor component, or said conclusion involves a high degree of uncertainty.

It is therefore advantageous if the tip 1 has high stiffness. As a result, the tip 1 has a higher moment of resistance to bending, and the measurement can be carried out more precisely. The stiffness can depend not only on the material of the tip, but also on a tip geometry, in particular the length L and the thickness D.

The stiffness of the tip 1 can be increased, for example, by providing a tip 1 with a greater thickness D. However, this is only possible to a certain extent, since on the one hand the measurement resolution of the tip 1 may decrease. On the other hand, the thickness D of the tip 1 cannot be chosen to be arbitrarily large, since the tip 1 must be introduced into a trench with a certain width.

Additionally or alternatively, the tip 1 can also be made shorter, so that the bending of the tip 1 can also be reduced as a result. However, it must also be ensured here that, for example, a bottom of the trench can still be scanned by means of the tip 1.

An optimal tip 1 would be, for example, several factors longer than the depth of the structure to be measured and would be as thin as possible so that even small structures can be measured with high resolution. Since this is not possible in reality due to the bending of the tip 1, a compromise must always be found between length L, thickness D, and the measurement resolution. A tip geometry of the tip 1 can be optimized according to the method according to the invention. For this purpose, a basic tip form can be selected in a step upstream of the manufacturing process. Proceeding from this form, the tip geometry can be optimized with regard to defined, required measurement properties.

Figure 2:
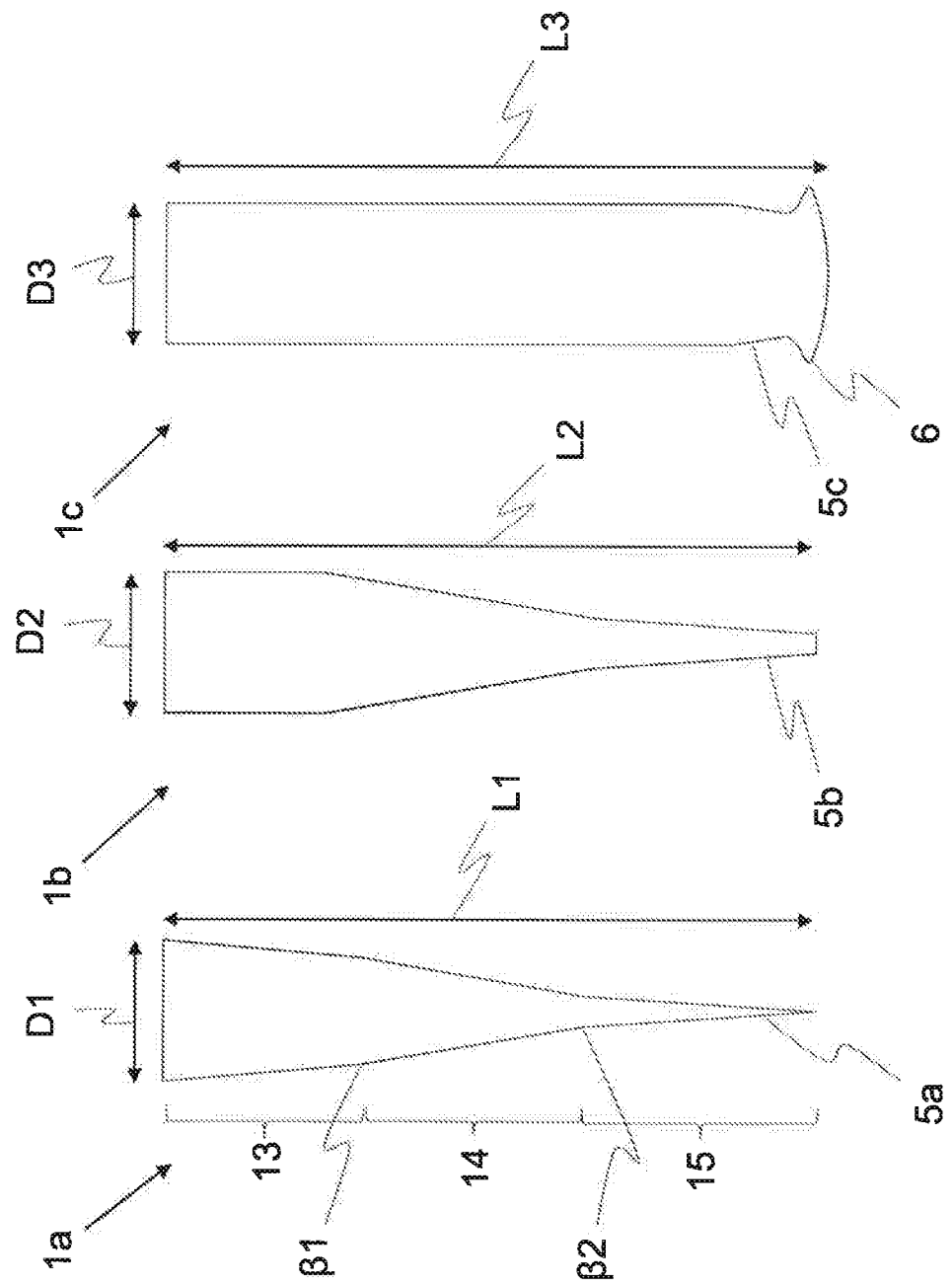
FIG. 2 shows an exemplary selection of basic tip forms.

FIG. 2 shows an exemplary selection of different basic tip forms 1a-1c. The basic tip forms 1a-1c can already exist as a computational data set and can serve as a template for a new tip 1. The basic tip form can be selected, for example, according to customer requirements. The basic tip form 1a-1c that already best suits the new customer requirements can be selected. The basic tip form can thus serve as a starting point for optimizing the basic tip form.

According to the present exemplary embodiment, the basic tip form 1a has a front section 5a which tapers to a point. This can be used, for example, to scan a structure of a semiconductor component which has fine trenches and/or holes. According to FIG. 2, the basic tip form 1a can have a plurality of regions 13, 14, 15. For the sake of simplicity, the regions 13, 14, 15 are only provided with a reference number on the basic tip form 1a. According to the present exemplary embodiment in FIG. 2, the basic tip form 1a has three regions 13, 14, 15 which are adjacent to one another along the length L1. The basic tip forms 1a-1c can also have more than three regions 13, 14, 15. Alternatively, the basic tip forms 1a-1c can also have fewer than three, for example two or only a single, region(s) 13, 14, 15. According to the present exemplary embodiment, the thickness D decreases in the direction of the front section 5a. Additionally or alternatively, a thickness D can also be constant in a region along the length L1.

The first region 13 is arranged at the end of the basic tip form 1a opposite the front section 5a, the second region 14 being arranged adjacent thereto. The third region 15 is arranged at the end of the tip 1a of the front section 5a. A thickness D of the different regions 13, 14, 15 can be optimized individually and/or independently of the others. For this purpose, the thickness D of the regions 13, 14, 15 can be individually modified, simulated, and evaluated. Of course, the tip geometry can also be simulated and evaluated if the thickness D has only been modified in one region 13, 14, 15. Additionally or alternatively, the lengths of the individual regions 13, 14, 15 can be modified, simulated, and evaluated individually and independently of one another. Furthermore, the tips 1 can also have more or fewer than the three regions 13, 14, 15 of the exemplary embodiment shown in FIG. 2.

In the present exemplary embodiment, angles β1, β2 are formed between the three regions 13, 14, 15, which for the sake of simplicity are again provided with a reference number only on the tip geometry 1a. The angle or angles β1, β2 between the regions 13, 14, 15 along the length L1 can also be modified in order to optimize the tip 1. After each modification 11 of the angle β1, β2, the tip 1 can be simulated and evaluated. The optimization of the angles β1, β2 can also be carried out partially automatically, for example if the angles β1, β2 are modified step by step within an interval, and the tip 1 is simulated and evaluated after each step.

The basic tip form 1b, on the other hand, has a blunt front section 5b. This basic tip form 1b can be used, for example, to measure only the depth of the trench. The exact structure may not be important in such a case. The basic tip form 1c, on the other hand, can be used when a wall of the trench is to be scanned. Additionally or alternatively, for example, the corners of the trench can also be scanned with the basic tip form 1c. For this purpose, the basic tip form 1c has a plate section 6 in the front section 5c. The plate section 6 protrudes beyond the peripheral surface of the basic tip form 1c, so that a side wall can be scanned with it. The plate section 6 has in particular a width which is greater than the thickness D3 of the basic tip form 1c.

Figure 3:
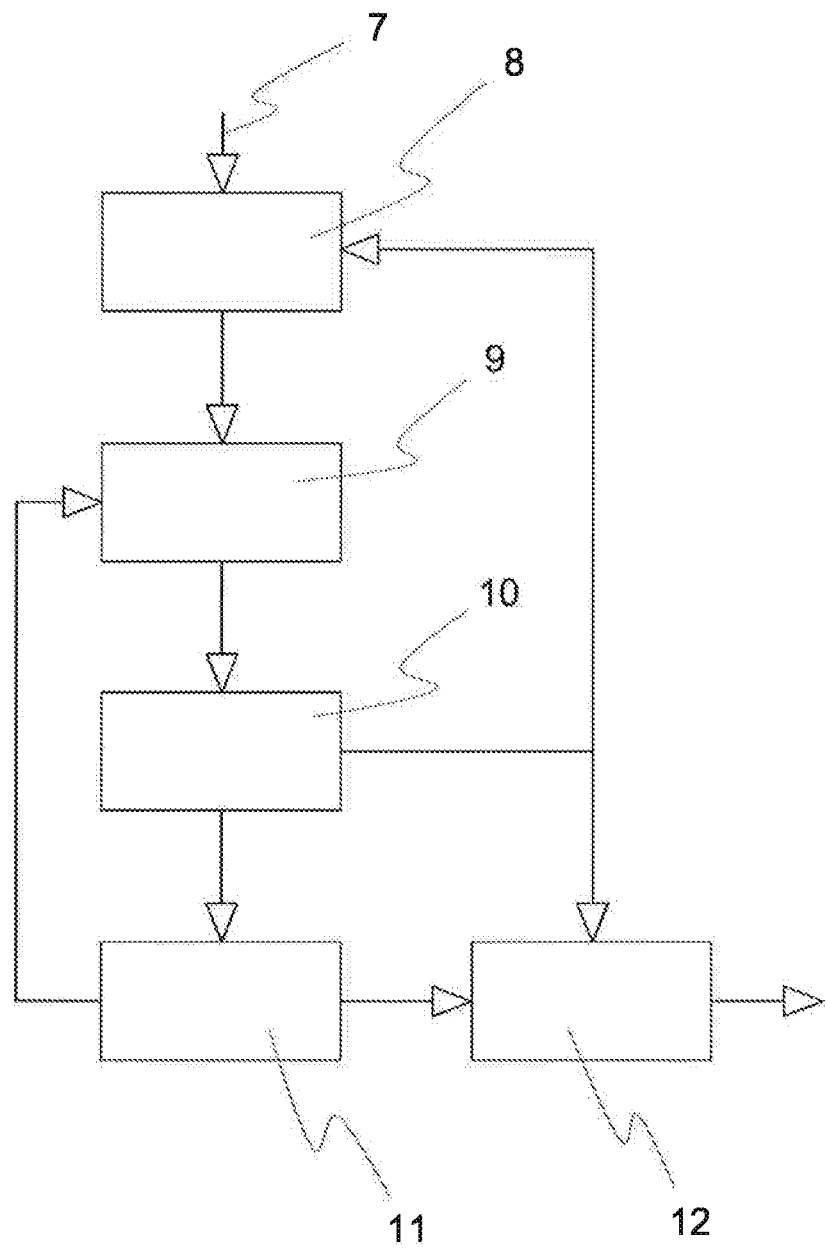
FIG. 3 shows a flow diagram of the provision of the tip for scanning probe microscopy.

FIG. 3 shows a flow diagram of the provision of a tip 1 according to the invention for scanning probe microscopy. Defined measurement properties 7 of the tip 1 required by the customer serve as input data. For example, the customer requests measurement properties 7 such that a depth of a trench and/or a hole in a semiconductor component with a depth of 200 nanometers can be measured by means of the tip 1. The trench can have a width of 25 nanometers, for example. A structure at the bottom of the trench is to be measured with a measurement resolution of 5 nanometers. The tip 1 may only deflect by a certain angle or offset in order to ensure the quality of the measurement.

On the basis of these required measurement properties 7, a basic tip form 1a-1c can be selected in advance in a selection step 8, as shown for example in FIG. 2. The basic tip form 1a-1c can thus serve as a blank for further optimization of the tip geometry. For example, tip 1a of FIG. 2 can be selected, since a depth of the trench and a structure at the bottom of the trench are decisive for the customer.

After selection 8 of the basic tip form 1a-1c, a simulation 9 of the tip geometry belonging to the basic tip form 1a-1c can be carried out. The simulation 9 can be carried out, for example, using finite element methods. On the basis of the simulation 9, a deflection, bending and/or loading of the tip 1 by the forces acting on the tip 1 in the trench, for example van der Waals inter-actions, can be determined. Based on the load, it can be recognized, for example, whether the tip 1 will break due to the loads, so that, for example, a new basic tip form 1a-1c can be selected.

After simulation 9, an evaluation 10 of the tip 1 can be carried out on the basis of simulation results. The simulation results can show, for example, that a stiffness specified by the customer is only achieved by 50%. In the evaluation 10, the stiffness of the tip 1 can be assigned an evaluation value—in this example, for example, an evaluation value of 0.5.

Additionally or alternatively, the simulation results can include that the tip 1 achieves only 50% of the measurement resolution required by the customer. The measurement resolution can also be assigned an evaluation value, which in this example can be 0.5, for example. An evaluation 10 can be created from this, which in this case states that the measurement properties required by customers have not been achieved. The two evaluation values mentioned above can be combined into an overall evaluation value in order to be able to draw a conclusion by means of a single value as to whether the required measurement properties have been achieved.

The evaluation values can also exceed the measurement properties required by the customer, i.e., the tip 1 fulfills the measurement requirements of the customer, so that production 12 of the tip 1 can be started immediately. This can save time and therefore costs.

Alternatively, if the evaluation 9 is poor, for example, if the required measurement properties have not been achieved, the selection 8 of the basic tip form 1a-1c can also be carried out. A different basic tip form 1a-1c which is better suited as a starting point for optimizing the tip geometry can then be selected.

After the evaluation 10, the tip geometry can be modified as a function of the evaluation 10 during the renewed simulation using the finite element method. The modification 11 can, for example, simulate a modification 11 of the thickness D and/or a modification of the length L. In the present case, if the required measurement properties are not achieved, a thickness D of the tip 1 can be increased in at least one region, for example, in order to achieve the necessary stiffness. Additionally or alternatively, a length L of the tip 1 can also be reduced. However, care must be taken to ensure that the measurement properties required by the customer are observed. For example, the tip 1 cannot be shortened to such an extent that it can no longer reach the bottom of the trench. As a result, the evaluation value of the dimensions falls, for example, from an evaluation value "1," which corresponds, for example, to the suitability that the tip 1 can measure the bottom to the evaluation value "0," which means that the tip 1 can no longer measure the bottom of the trench and is therefore not suitable for measuring the bottom.

The optimization of the tip geometry can be done partially automatically. For example, the modification 11 of the tip geometry can be carried out manually before the simulation is repeated using the finite element method. Experience of a manufacturer can be used in this case.

The optimization of the tip geometry can also take place in a partially automated manner if, for example, an interval of lengths L of tip 1 is specified, the lengths L of the interval being simulated and/or evaluated step-by-step. For example, the simulation can be started with a length L of the tip 1 of 200 nanometers. After the simulation 9 and/or the evaluation 10, the length L of the tip 1 can be increased step-by-step, for example by 5 nanometers, up to 300 nanometers, the tip 1 being simulated and evaluated again after each step. The simulation according to the interval is done automatically in this case. The interval and/or the steps can be defined manually. In particular, other values for the interval, for example a lower threshold, upper threshold, and/or steps can be set manually after each interval.

After the simulated modification 11 of the tip geometry, production 12 of the tip 1 can be started once a positive evaluation is obtained. Alternatively, after the modification 11, a dataset describing the tip geometry can also be sent to the customer. The customer can then manufacture the optimized tip 1 himself or have it manufactured.

Alternatively, even after the modification 11, the new tip geometry can be simulated again in an additional simulation 9. After the simulation 9 using the finite element method, a further evaluation 10 can take place. After this evaluation 10, the tip 1 can be released for manufacture 12, or a new basic tip form can be selected in a repeated selection step 8. Alternatively, after the additional evaluation 10, another modification 11 can be made to the tip geometry. The tip 1 can then also be released for manufacture 12 thereafter. Alternatively, the tip geometry, which has now been modified again, can be simulated again using simulation 9.

The simulation 9, the evaluation 10, and the modification 11 of the tip geometry are advantageously carried out several times. As a result, the tip 1 can be improved up to or at least close to an optimum.

The modification 11 of the tip 1 can also be such that a return is made to a tip geometry from a previous simulation, evaluation, and modification step and is modified from there in another way.

The present invention is not limited to the illustrated and described embodiments. Variations within the scope of the claims are also possible as a combination of features, even if they are shown and described in different embodiments.

LIST OF REFERENCE NUMBERS 1 tip
2 probe device
3 cantilever
4 tip base
5 front section
6 plate section
7 required measurement properties
8 selection of the basic tip form
9 simulation
10 evaluation
11 modification
12 manufacture
13 first region
14 second region
15 third region
L length of the tip
D thickness of the tip
α angle
β angle

What is claimed is:

1. A method for providing a probe device for scanning probe microscopy, in particular for atomic force microscopy, wherein a scanning probe microscope is used to measure a sample by means of a tip having a tip geometry arranged on a cantilever of the probe device, comprising:
    selecting a basic tip form based on defined, required measurement properties;
    simulating the tip geometry of the basic tip form in the defined, required measurement properties;
    evaluating the measurement properties of the tip based on the simulation of the tip geometry;
    modifying the simulation of the tip geometry based on the evaluation of the measurement properties of the tip; and
    manufacturing the tip based on the modification of the simulation of the tip geometry.

2. The method according to claim 1, wherein evaluating the measurement properties of the tip comprises evaluating at least one of a rigidity of the tip, a measurement resolution of the tip, or a dimension of the tip.

3. The method according to claim 2, further comprising assigning an evaluation value based on the evaluation of each of the measurement properties of the tip.

4. The method according to claim 3, further comprising forming an overall evaluation value based on the combination of each evaluation value.

5. The method according to claim 1, further comprising optimizing the tip geometry by repeating the steps of simulating, evaluating, and modifying.

6. The method according to claim 1, further comprising optimizing the tip geometry by manually entering a parameter value of the tip geometry.

7. The method according to claim 3, further comprising at least one of the following steps:
    reducing a thickness of the tip in at least one region of the tip geometry when the evaluation value according to claim 3 exceeds a predefined threshold;
    increasing a thickness of the tip in at least one region of the tip geometry when the evaluation value according to claim 3 falls below a predefined threshold;
    increasing a length of the tip when the evaluation value according to claim 3 exceeds a predefined threshold; or
    reducing a length of the tip when the evaluation value according to claim 3 falls below a predefined threshold.

8. The method according to claim 4, further comprising repeating at least one of the steps of simulating, evaluating, or modifying until at least one of the evaluation value or the overall evaluation value of the tip geometry exceeds a predefined threshold.

9. The method according to claim 4, further comprising repeating at least one of the steps of simulating, evaluating, or modifying until at least one of the evaluation value or the overall evaluation value no longer improves.

10. The method according to claim 1, further comprising using finite element methods in the step of simulating.

11. The method according to claim 1, further comprising using at least one of additive or subtractive production processes in the step of manufacturing.

12. The method according to claim 1, further comprising removing at least part of a surface section of the tip by ion etching.

13. A probe device for scanning probe microscopy, in particular for atomic force microscopy, having a cantilever and a tip formed on the cantilever in the nanometer range, with which a sample to be measured can be measured, wherein the probe device is produced according to claim 1.

14. The probe device according to claim 13, wherein the tip is at least partially formed from at least one of an amorphous carbon or a crystalline diamond.

15. The method according to claim 4, further comprising at least one of the following steps:
    reducing a thickness of the tip in at least one region of the tip geometry when the overall evaluation value according to claim 4 exceeds a predefined threshold;
    increasing a thickness of the tip in at least one region of the tip geometry when the overall evaluation value according to claim 4 falls below a predefined threshold;
    increasing a length of the tip when the overall evaluation value according to claim 4 exceeds a predefined threshold; or
    reducing a length of the tip when the overall evaluation value according to claim 4 falls below a predefined threshold.

* * * * *